May 12, 1931.    W. J. BLENKO    1,804,395
MANUFACTURE OF REENFORCED GLASS
Filed July 3, 1929
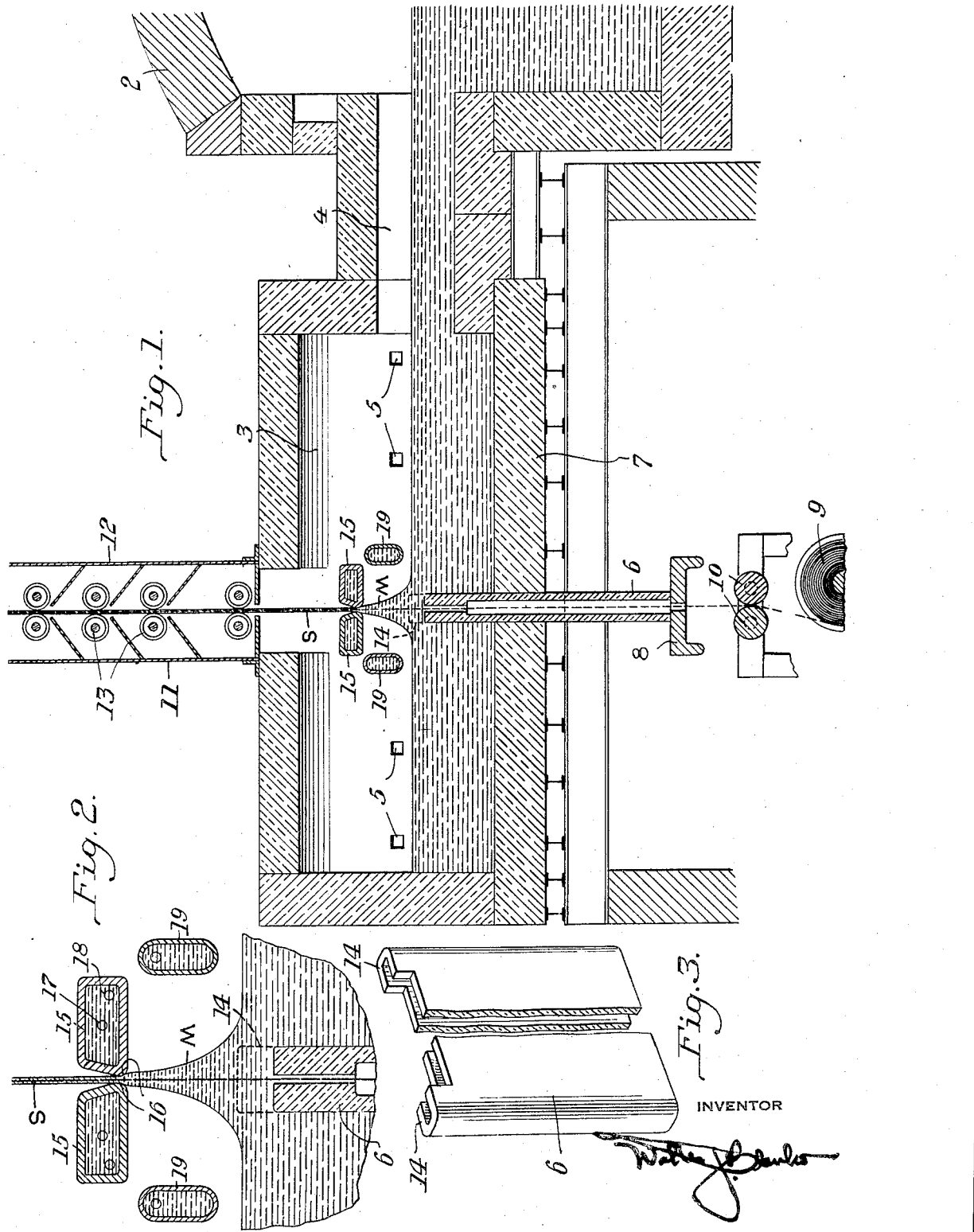
INVENTOR Patented May 12, 1931

1,804,395

UNITED STATES PATENT OFFICE

WALTER J. BLENKO, OF PITTSBURGH, PENNSYLVANIA, ASSIGNOR TO CLARENCE P. BYRNES, OF SEWICKLEY, PENNSYLVANIA, AS TRUSTEE

MANUFACTURE OF REENFORCED GLASS

Application filed July 3, 1929. Serial No. 375,803.

This invention relates to the manufacture of reenforced glass and provides a continuous process whereby an improved product may be obtained. I provide for drawing glass upwardly from a molten bath in sheet form and with a reinforcement embedded therein, there being a meniscus portion above the bath and terminating in the formed sheet, and engaging the rising glass in the meniscus portion so as to size and shape the same. Preferably the glass is engaged by shaping dies which effect a sliding contact with the glass. Such dies are maintained at above the checking temperature of the glass but below the sticking temperature thereof. By reason of the fact that the glass is engaged in the meniscus portion where it is still quite plastic, a thorough bonding of the glass with the reinforcement is effected, all air bubbles are eliminated, and in addition to this the shaping dies impart an improved surface condition to the sheet.

In the accompanying drawings illustrating the present preferred embodiment of the invention, Figure 1 is a transverse section through a melting tank and forehearth equipped to carry out the invention;

Figure 2 is a detail view to enlarged scale of a portion of Figure 1 and showing the rising glass; and Figure 3 is a perspective view of the feeding device employed for supplying the reinforcement.

The apparatus shown in the drawings comprises a melting tank 2 connected to a forehearth 3 by a channel 4. Burners 5 maintain the glass in the drawing chamber at the desired temperature for drawing.

A hollow wire guide 6 in the form of a refractory tube extends upwardly through the floor 7 of the drawing chamber. It is mounted on a support 8 movable up or down by any desired means (not shown) so that if desired the upper end of the guide may lie above the glass level. Reinforcing wire is fed from a reel 9 through rollers 10 and thence upwardly through the guide and protector 6. The guide 6 is narrower than the drawing chamber 3 so that glass may flow therearound as will be necessary when the apparatus is in operation.

A Fourcault drawing unit, indicated generally by the reference character 11, is located above the drawing chamber 3 and comprises a casing 12 and draft rollers 13 driven as is usual in apparatus of this character.

In starting a draw the protector 6 is raised above the level of the glass and wire is fed upwardly therethrough to the draft rollers 13. The protector is then lowered to the position shown in Figure 1 so that glass flows over it and onto the wire. As the wire is drawn upwardly the glass is picked up with it and moves upwardly in sheet form. The protector 6 is provided with end portions 14 which will always lie above the glass level as shown in dotted lines in Figure 1. This leaves the edges of the wire uncoated and also permits of using wire of different widths.

The rising sheet S is connected to the bath by a meniscus M. This meniscus is engaged adjacent its upper portion by shaping dies 15. These dies have adjacent faces which are curved, as indicated at 16, adjacent their bottom portions to slidably engage the glass. They are made of a non-pitting, non-corroding metal capable of taking a high polish such as Duraloy (a cast iron containing relatively high chromium). They are made hollow and are provided with conduits 17 having outlets 18 whereby cooling fluid may be circulated through them to maintain the effective die portion 16 above the checking temperature and below the sticking temperature of the glass. Coolers 19 are provided for conditioning the glass adjacent the point of drawing and for assisting in chilling the same. As the glass is drawn upwardly it has skins thereon, which skins are engaged by the shaping dies. No marring results.

The shaping dies size the sheet as best shown in Figure 2 and substantially eliminate waves and other surface defects from the glass. At the same time they have a compressing action which insures consolidation of the glass with the reinforcing wire. The process is a continuous one, the glass flowing to the drawing chamber 3 through the channel 4 and flowing around the ends of the protector 6 so that both sides thereof are constantly supplied with molten glass.

I have illustrated and described a present preferred embodiment of the invention. It will be understood, however, that it is not limited to the form shown but may be otherwise embodied or practiced within the scope of the following claims.

I claim:

1. In the method of making reenforced glass, the steps consisting in drawing glass upwardly from a molten bath in sheet form and with a reinforcement embedded therein, there being a meniscus portion above the bath and terminating in the formed sheet, and causing first contact with the glass by slidably engaging the surfaces of the rising glass in the meniscus portion so as to size and shape the same.

2. In the method of making reenforced glass, the steps consisting in drawing glass upwardly from a molten bath in sheet form and with a reinforcement embedded therein, there being a meniscus portion above the bath and terminating in the formed sheet causing first contact with the rising glass by slidably engaging the surfaces of the rising glass in the meniscus portion so as to size and shape the same, and maintaining the active portions of the dies above the checking temperature and below the sticking temperature.

3. Apparatus for making reenforced glass comprising a bath of molten glass, a guide extending upwardly through the bath and adapted for the feeding of a reinforcing material therethrough, the guide terminating below the surface of the glass whereby as the reinforcement rises upwardly glass adheres thereto and forms a meniscus, means for drawing the formed glass upwardly, and cooling surfaces having initial sliding engagement with the rising glass.

4. Apparatus for making reenforced glass comprising a bath of molten glass, a guide extending upwardly through the bath and adapted for the feeding of a reinforcing material therethrough, the guide terminating below the surface of the glass whereby as the reinforcement rises upwardly glass adheres thereto and forms a meniscus, means for drawing the formed glass upwardly, and shaping dies having initial contact with and slidably engaging the meniscus.

5. Apparatus for making reenforced glass comprising a bath of molten glass, a guide extending upwardly through the bath and adapted for the feeding of a reinforcing material therethrough, the guide terminating below the surface of the glass whereby as the reinforcement rises upwardly glass adheres thereto and forms a meniscus, means for drawing the formed glass upwardly, shaping dies having initial sliding contact with the meniscus, and means for cooling the dies.

In testimony whereof I have hereunto set my hand.

WALTER J. BLENKO.